(12) United States Patent
Wolan, II et al.

(10) Patent No.: US 11,490,148 B2
(45) Date of Patent: Nov. 1, 2022

(54) SYSTEMS AND METHODS TO DETERMINE WHEN TO REJOIN A LIVE MEDIA BROADCAST AFTER AN INTERRUPTION

(71) Applicant: Disney Enterprises, Inc., Burbank, CA (US)

(72) Inventors: James R. Wolan, II, The Woodlands, TX (US); Efthimis Stefanidis, Douglaston, NY (US); Vladislav Feldman, Las Vegas, NV (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/466,932

(22) Filed: Sep. 3, 2021

(65) Prior Publication Data

US 2022/0078499 A1 Mar. 10, 2022

Related U.S. Application Data

(60) Provisional application No. 62/706,726, filed on Sep. 4, 2020.

(51) Int. Cl.
| | |
|---|---|
| *H04N 21/2187* | (2011.01) |
| *H04N 21/845* | (2011.01) |
| *H04N 21/442* | (2011.01) |
| *H04N 21/81* | (2011.01) |
| *H04N 21/262* | (2011.01) |
| *H04N 21/25* | (2011.01) |
| *H04N 21/231* | (2011.01) |

(52) U.S. Cl.
CPC ..... *H04N 21/2625* (2013.01); *H04N 21/2187* (2013.01); *H04N 21/231* (2013.01); *H04N 21/251* (2013.01); *H04N 21/8455* (2013.01)

(58) Field of Classification Search
CPC ........... H04N 21/2625; H04N 21/2187; H04N 21/231; H04N 21/251; H04N 21/8455
See application file for complete search history.

(56) References Cited

U.S. PATENT DOCUMENTS

| | | | |
|---|---|---|---|
| 5,818,439 A | 10/1998 | Nagasaka | |
| 7,870,592 B2 | 1/2011 | Hudson | |
| 9,697,295 B1 | 7/2017 | Nijim | |
| 9,948,966 B1* | 4/2018 | Panchaksharaiah | ........................ H04N 21/26283 |
| 10,917,704 B1* | 2/2021 | Hamid | ............... H04N 21/4725 |
| 2005/0251835 A1 | 11/2005 | Scott, III | |
| 2012/0209961 A1 | 8/2012 | Mccoy | |
| 2014/0257921 A1* | 9/2014 | Bear | .................. G06Q 30/0269 705/7.29 |
| 2015/0172342 A1 | 6/2015 | Yin | |
| 2018/0279009 A1* | 9/2018 | Feldman | ............ H04N 21/4882 |
| 2018/0287808 A1* | 10/2018 | Liston | ................. G06F 11/3438 |
| 2020/0382841 A1* | 12/2020 | Gupta | .................... H04N 21/84 |

* cited by examiner

*Primary Examiner* — Nnenna N Ekpo
(74) *Attorney, Agent, or Firm* — Esplin & Associates, PC (57) ABSTRACT

Systems and methods to determine when to rejoin a live media broadcast after an interruption are presented herein. Weighting information including individual weights conveying importance of attribute values for a set of broadcast attributes of the live media broadcast may be obtained. One or more of the weighting information, the attribute values, and/or other information may facilitate making a determination of a rejoin point in time in the live media broadcast for rejoining the live media broadcast upon a completion of an interruption.

18 Claims, 4 Drawing Sheets

SYSTEMS AND METHODS TO DETERMINE WHEN TO REJOIN A LIVE MEDIA BROADCAST AFTER AN INTERRUPTION

CROSS-REFERENCE TO RELATED APPLICATIONS

The present application claims the benefit of and priority to U.S. Provisional Patent Application Ser. No. 62/706,726, filed Sep. 4, 2020, and titled "SYSTEMS AND METHODS TO DETERMINE WHEN TO REJOIN A LIVE MEDIA BROADCAST AFTER AN INTERRUPTION," which is hereby incorporated fully by reference into the present application.

FIELD OF THE DISCLOSURE

The present invention relates generally to rejoining a live media broadcast after an interruption.

BACKGROUND

Televised live shows, such as award shows, entertainment events, and sports games, may be interrupted by breaking events, such as a news or weather emergency. Traditional television techniques may use local records and/or manual interventions to rejoin the live show. For example, a traditional "join-in-progress" technique may include rejoining the original program at the end of the interruption as if the original program had been running in the background.

SUMMARY

One aspect of the disclosure relates to a system configured to determine when to rejoin a live media broadcast after an interruption. Traditional techniques for rejoining live shows after an interruption may become complicated with regional or time zone activity, where different interstitial content goes to different regions. Traditionally, this may be handled in a complex fashion manually in individual local studio control rooms. Often a disturbance in a first time zone may create havoc in subsequent time zones. Broadcast studios may utilize complex books with guidelines on how to handle situations such as these. When dealing with distributed media (e.g., a live media broadcast), where the playout comes from a remote data center or public/private cloud, traditional techniques may no longer be feasible. In these environments there may be a standalone video play/record engine with a playlist for interstitial content for individual time zones or regional feeds. While recording of the interrupted live event is possible, there have yet to be mechanisms to intelligently and elegantly join back to the original program after the interruption is complete.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
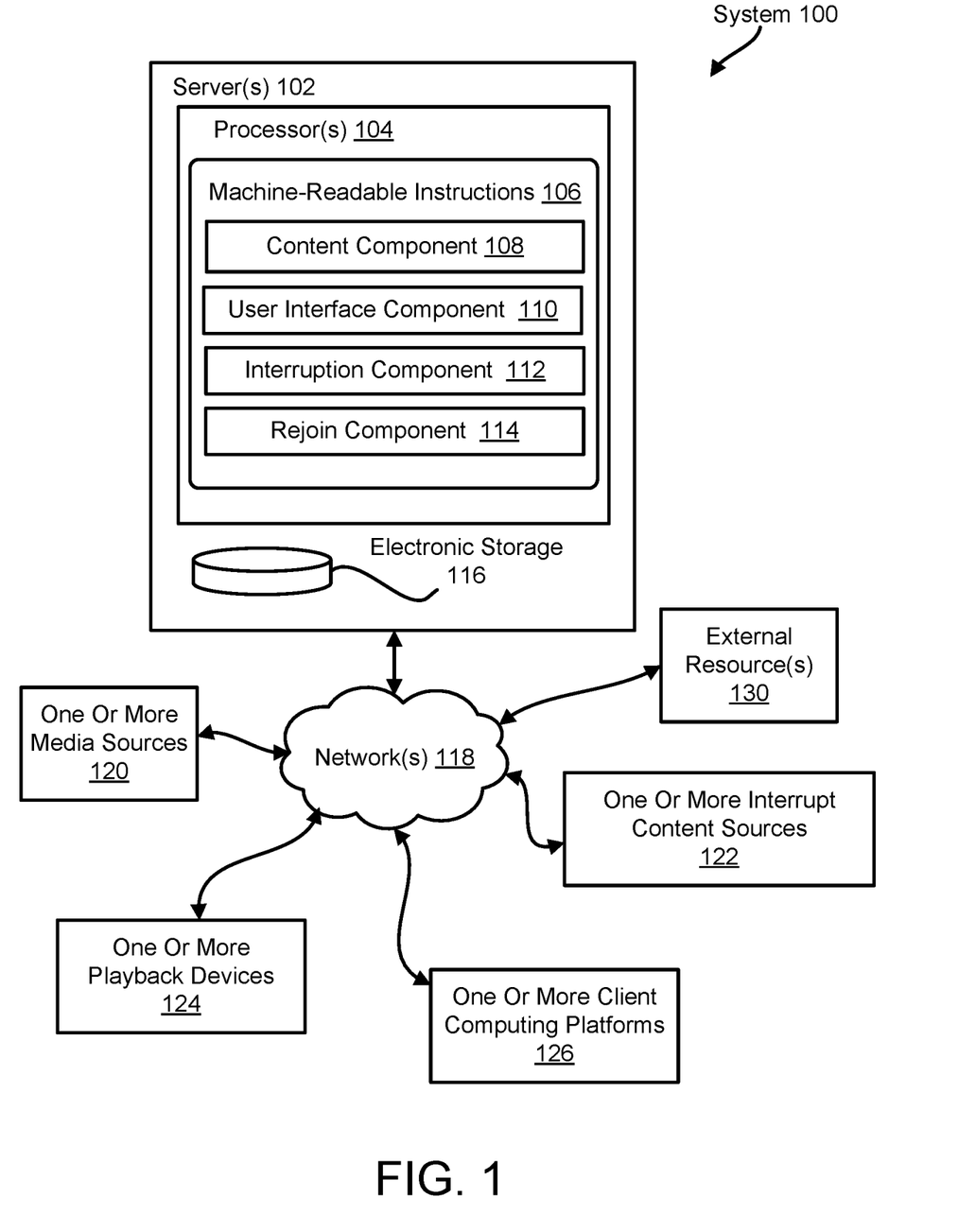
FIG. 1 illustrates a system configured to determine when to rejoin a live media broadcast after an interruption, in accordance with one or more implementations.

FIG. 1 illustrates a system 100 configured to determine when to rejoin a live media broadcast after an interruption. A live media broadcast may include one or more of an award show, an entertainment event, a sports game, and/or other media broadcast. The live media broadcast may include a set of interstitial media content to be presented during the live media broadcast. The interstitial media content may be presented, for example, in between portions/segments of primary content of the live media broadcast. Interstitial media content may include one or more of commercials, advertisements, promotions, trailers, and/or other content. An interruption may include one or more of a breaking news event, an emergency system alert, a weather alert, an AMBER alert, a traffic alert, and/or other interruptions. Details of the interruption, such as start time and/or duration, may be unknown. Features and/or functions of the systems and methods presented herein may facilitate a dynamic approach for determining when to rejoin a live media broadcast after an interruption based on one or more of user input, machine-learning, and/or other techniques.

The system 100 may include one or more of one or more servers 102, one or more media sources 120, one or more interrupt content sources 122, one or more playback devices 124, one or more client computing platforms 126, and/or other components. Server(s) 102 may be configured to communicate with one or more client computing platforms 126 according to a client/server architecture and/or other architectures. Client computing platform(s) 126 may be configured to communicate with other client computing platforms via server(s) 102 and/or according to a peer-to-peer architecture and/or other architectures. Users may access system 100 via individual ones of the client computing platform(s) 126.

In some implementations, one or more servers 102, one or more media sources 120, one or more interrupt content sources 122, one or more playback devices 124, one or more client computing platforms 126, and/or external resource(s) 130 may be operatively linked via one or more electronic communication links. For example, such electronic communication links may be established, at least in part, via network(s) 118 such as the Internet and/or other wired and/or wireless networks. It will be appreciated that this is not intended to be limiting, and that the scope of this disclosure includes implementations in which one or more servers 102, one or more media sources 120, one or more interrupt content sources 122, one or more playback devices 124, one or more client computing platform 126, and/or external resource(s) 130 may be operatively linked via some other communication media.

An individual client computing platform of one or more client computing platforms 126 may include one or more processors configured to execute computer program components. The computer program components may be configured to enable an expert or user associated with the individual client computing platform to interface with system 100 and/or provide other functionality attributed herein to client computing platform(s) 126. By way of non-limiting example, an individual client computing platform may include one or more of a desktop computer, a laptop computer, a handheld computer, a tablet computing platform, a netbook, a smartphone, a smart television, and/or other computing platforms.

External resource(s) 130 may include sources of information outside of system 100, external entities participating with system 100, and/or other resources. In some implementations, some or all of the functionality attributed herein to external resource(s) 130 may be provided by resources included in system 100.

Server(s) 102 may include electronic storage 116, one or more processors 104, and/or other components. Server(s) 102 may include communication lines, or ports to enable the exchange of information with network(s) 118 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may comprise non-transitory storage media that electronically stores information. The electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 104, information received by server(s) 102, information received from client computing platform(s) 126, and/or other information that enables server(s) 102 to function as described herein.

Processor(s) 104 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. Processor(s) 104 may be configured to execute content component 108, user interface component 110, interruption component 112, and/or rejoin component 114 (hereinafter collectively referred to as "components 108, 110, 112, and/or 114"), and/or other components. Processor(s) 104 may be configured to execute components 108, 110, 112, and/or 114, and/or other components by software; hardware; firmware; some combination of software, hardware, and/or firmware; and/or other mechanisms for configuring processing capabilities on processor(s) 104. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 104 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 104 may be configured to execute one or more additional components that may perform some or all of the functionality attributed below to one of components 108, 110, 112, and/or 114.

A media source of one or more media sources 120 may include one or more of a host and/or provider of a live media broadcast, a host and/or provider of interstitial media content, and/or other sources of other content. A media source may include one or more of a studio, a broadcast station, a remote host, a production facility, and/or other media sources.

A media source of a live media broadcast may generate and/or provide live broadcast information defining the live media broadcast. The live broadcast information defining the live media broadcast may include video information and/or other information. Video information may include information defining a video. A video may include one or more of visual content, audio content, textual content, and/or other content. Visual content may include frame images of a video configured to be presented in sequence and at a rate of playback. Audio content may include audio (e.g., sound) that may accompany the visual content. Audio content may be synchronized with visual content. In some implementations, video information may include information that may be readable by a playback device that may allow the playback device to reproduce audio content and/or visual content of a video.

A media source of primary content or interstitial media content may provide and/or generate traffic schedule information related to integration of interstitial media content into a live media broadcast. The traffic schedule information may include one or more of content information, timing information, and/or other information.

The content information may define a set of interstitial media content. An individual interstitial media content may include one or more of visual content, audio content, textual content, and/or other content. Visual content may include frame images of a video configured to be presented in sequence and at a rate of playback. Audio content may include audio (e.g., sound) that may accompany the visual content. Textual content may include words such as subtitles other captions that may accompany the visual and/or audio content.

The timing information may specify one or more of individual points in time during the live media broadcast when the individual interstitial media content is to be presented, individual durations of the individual interstitial media content, and/or other information. In some implementations, multiple interstitial media content may be presented back-to-back in what may be referred to as a "pod." Individual elements of the interstitial media content within a "pod" may be assigned a "position" within the "pod" which may dictate the order in which the individual elements of the interstitial media content are presented within the pod. Sets of interstitial media content may be assigned a "pod number" which may dictate the order in which the pods are presented.

An interrupt content source of one or more interrupt content sources 122 may include a host and/or provider of interruption content. The interruption content may define an interruption. An interruption may include one or more of breaking news, report, an emergency system alert, a weather alert, an AMBER alert, a traffic alert, and/or other content that was not scheduled to be presented during the live media broadcast. A host and/or provider of interruption content may include one or more of a studio, a broadcast station, a remote host, a production facility, and/or other media sources.

Individual playback devices of one or more playback devices 124 may be configured to effectuate reproduction of one or more of visual content, audio content, and/or other media content. A playback device may be configured with integrated network features. A playback device may include and/or may be in communication with one or more components configured to facilitate playback of media. A playback device may include and/or may be in communication with one or more of a display for reproducing visual media content, a speaker for reproducing audio media content, and/or other components. By way of non-limiting illustration, a playback device may include one or more of a television, a smart TV, a set-top box, a desktop computer, a laptop computer, a tablet, a smartphone, and/or other devices.

The one or more servers 102 may include one or more of one or more physical processors 104, non-transitory electronic storage 116, and/or other component(s). The one or more physical processors 104 may be configured by machine-readable instructions 106. Executing the machine-readable instructions 106 may cause one or more physical processors 104 to facilitate providing video and control signals over an internet protocol (IP) communications network. The machine-readable instructions 106 may include one or more of a content component 108, a user interface component 110, an interruption component 112, a rejoin component 114, and/or other components.

The content component 108 may be configured to obtain one or more of attribute information, live broadcast information, traffic schedule information, and/or other information. In some implementations, the live broadcast information may be obtained from one or more media sources 120 and/or other sources. In some implementations, the traffic schedule information may be obtained from one or more media sources 120 and/or other sources.

The attribute information may include a set of attribute values for a set of broadcast attributes of a live media broadcast and/or other information. The live media broadcast may include primary content (i.e., the live media event itself (e.g., award show, entertainment event, sports game, etc.)) and one or more sets of interstitial media content to be presented during the primary content. The set of attribute values for the set of broadcast attributes may impact a rejoin point in time within the live media broadcast to rejoin upon completion of an interruption. The set of broadcast attributes may relate to the primary content, the one or more sets of interstitial media content, the interruption, and/or the subsequent media content scheduled to be broadcast after the primary content. For example, the set of broadcast attributes related to the primary content may include one or more of a primary content attribute or a primary distribution attribute, the set of broadcast attributes related to the one or more sets of interstitial media content may include one or more of a pod number or a position of an individual element of the interstitial media content within a given pod (i.e., set of interstitial media content), the set of broadcast attributes related to the interruption may include one or more of an interruption content attribute or an interruption distribution attribute, and the set of broadcast attributes related to the subsequent media content may include one or more of a subsequent media content attribute or a subsequent media distribution attribute. In some implementations, the set of broadcast attributes includes attribute values related to all four categories: 1) the primary content, 2) the interstitial media content, 3) the interruption, and 4) the subsequent media content. In other implementations the set of broadcast attributes includes attribute values related to two or three of the categories such that one or more of the categories is omitted. In one example, the set of broadcast attributes includes attribute values related to the primary content and the interstitial media content, but does not include attribute values related to the interruption and the subsequent media content. In another example, the set of broadcast attributes includes attribute values related to the primary content, the interstitial media content, and the subsequent media content, but does not include attribute values related to the interruption. In yet another example, the set of broadcast attributes includes attribute values related to the primary content, the interstitial media content, and the interruption, but does not include attribute values related to the subsequent media content. In even further implementations, the set of broadcast attributes includes attribute values related to only one of the categories.

The primary content attribute may include one or more attribute values used to specify the worth or importance of the primary content interrupted by the interruption. Analogously, the interruption content attribute may include one or more attribute values used to specify the worth or importance of the interruption itself, while the subsequent media content attribute may include one or more attribute values used to specify the worth or importance of the subsequent media content. The attribute values of the primary content attribute, the interruption content attribute, and/or the subsequent media content attribute may be a quantitative value on a numerical scale from 0 to 1, where 0 may correspond to "low importance", 1 may correspond to "high importance", and decimals therebetween may correspond to varying degrees of importance. The numerical scale from 0 to 1 is for illustrative purposes only, and in other implementations a different scale may be used (e.g., a scale of integers from 0 to 5). Parameters affecting the attribute values of the primary content attribute, the interruption content attribute, and/or the subsequent media content attribute may include appeal, topicality, or interest in (e.g., based on ratings, earning potential, etc.), the primary content, the interruption, and/or the subsequent media content, respectively, where the more appeal, topicality or interest, the closer the respective attribute value(s) are to 1 (i.e., high importance). Parameters affecting the attribute values of the primary content attribute and the subsequent media content attribute may further include times at which the primary content and the subsequent media content are scheduled to be broadcast (e.g., primetime programming from 8 pm to 11 pm, daytime programming, etc.), where times corresponding to higher ratings or viewership (e.g., primetime programming) have a higher attribute value than times corresponding to lower ratings or viewership (e.g., daytime programming); relevance to subsequent content (e.g., in episodic content, an episode that must be viewed prior to the next episode or an episode that is part of a crossover event between two shows); or perishability of content (i.e., content that cannot be saved and presented at a later date because the content will lose its relevance). The attribute value(s) of the primary content attribute and the subsequent media content attribute may be pre-assigned in a broadcast traffic system that handles a daily schedule of content and interstitial media content to be broadcasted. The attribute values of the primary content attribute and the subsequent media content attribute may be assigned automatically (e.g., via machine learning) or manually by a media source based on the media source's own set of criteria. Attribute values of the interruption may be assigned by a media source based on the media source's own set of criteria. For example, a news report about a plane crash may result in a higher attribute value associated with the interruption content attribute if the location of the plane crash directly impacts the viewer base of the media source based, for example, on location of the plane crash, demographics of the plane crash victims, etc.

Attribute values of the primary distribution attribute, the interruption distribution attribute, and/or the subsequent media distribution attribute may specify distribution characteristics of the primary content, the interruption, and/or the subsequent media content, respectively. The distribution may include one or more of a quantity of means of distribution, a type of a means of distribution, and/or other information. In some implementations, an individual means of distribution may refer to an individual media source. In some implementations, a quantity of means of distribution may include a quantity of media sources and/or other sources providing the primary media content, the interruption, and/or the subsequent media content. By way of non-limiting illustration, one media source may provide the primary content, the interstitial media content, the interruption, and/or the subsequent media content to consumers in one location (e.g., west coast), while another media source may provide the primary content, the interstitial media content, the interruption, and/or the subsequent media content to consumers in another location (e.g., east coast). Accordingly, a respective attribute value may convey a quantity if "two" means of distribution of the primary content, the interstitial media content, the interruption, or the subsequent media content exist. A type of a means of distribution may refer to a channel of distribution used by a media source. By way of non-limiting illustration, types of means of distribution may include one or more of television distribution, radio distribution, internet-based distribution (e.g., distribution via a social media platform and/or other platform), and/or other types of means of distribution. The type of a means of distribution may identify alternate methods of distribution and/or potential for social media or the Internet to render content non-interesting (e.g., spoilers, redundancy, etc.).

Attribute values of the primary content attribute and the primary distribution attribute may be used to determine a worth or importance of the interrupted primary content. Attribute values of the interruption content attribute and the interruption distribution attribute may be used to determine a worth or importance of the interruption. Attribute values of the subsequent media content attribute and the subsequent media distribution attribute may be used to determine a worth or importance of the subsequent media content.

Individual attribute values of the set of broadcast attributes related to the one or more sets of interstitial media content may specify importance or worth of individual elements of interstitial media content. As discussed above, the set of broadcast attributes related to the one or more sets of interstitial media content may include one or more of a pod number attribute or a pod position attribute, where a pod position attribute relates to a position of an individual element of the interstitial media content within a given pod (i.e., set of interstitial media content). The pod number attribute and/or the pod position attribute may be a quantitative value on a numerical scale from 0 to 1, where 0 may correspond to "low importance", 1 may correspond to "high importance", and decimals therebetween may correspond to varying degrees of importance. The numerical scale from 0 to 1 is for illustrative purposes only, and in other implementations a different scale may be used (e.g., a scale of integers from 0 to 5). Alternatively or in addition, the pod number attribute and/or the pod position attribute may be a quantitative value based on an amount of consideration received for the pod number or a position of an individual element of interstitial media content within a given pod.

In some implementations, an attribute value of the pod number attribute varies based on a proximity of a given pod number to important parts of the primary content. For illustrative purposes, in an example in which the primary content is a football game, a pod number appearing before the beginning of the second quarter (i.e., a first pod number) may have a lower worth or importance than a pod number appearing before the two-minute warning of the fourth quarter (i.e., a second pod number). In some implementations, the worth or importance of an individual element of interstitial media content within a given pod may vary based on the position of the individual element of interstitial media content within the pod. For example, an individual element of interstitial media content at the beginning of the pod may have a higher worth or importance that an individual element of interstitial media content in the middle of the pod due to the increased likelihood that a user will watch the individual element of interstitial media content at the beginning of the pod without being distracted (e.g., by conversation) or getting up and leaving the room during the pod (e.g., bathroom break, getting food, etc.).

In some implementations, the set of broadcast attributes related to the one or more sets of interstitial media content may include an aesthetics attribute. In some implementations, aesthetics may refer to visual aesthetics and/or subject matter aesthetics. Visual aesthetics may include visuals that may be visually pleasing and/or other information may have positive connotations (e.g., imagery of puppies). Subject matter aesthetics may include subject matter that may elicit feelings of positivity or happiness in a viewer (e.g., commercial about a vacation destination). Aesthetic worth may be specified by a quantitative and/or qualitative value. A qualitative value may include one or more of "not aesthetic", "less aesthetic", "moderately aesthetic", "more aesthetic", "most aesthetic", and/or other considerations of qualitative expressions. In some implementations, a quantitative value may include a numerical value, percentage, and/or value within a scale that may be representative of an amount or degree of aesthetics. For example, a quantitative value may be a value on a numerical scale from 0 to 1, wherein 0 may correspond to no aesthetics, 1 may correspond to most aesthetic, and decimals therebetween may correspond to varying degrees of aesthetics. In some implementations, a qualitative value may correspond with a quantitative value. For example, a qualitative value of "not aesthetic" may correspond to a quantitative value of "0", a qualitative value of "most aesthetic" may correspond to a quantitative value of "1", and other variances in qualitative expressions may correspond to decimals between "0" and "1". The numerical scale from 0 to 1 is for illustrative purposes only, and in other implementations a different scale may be used (e.g., a scale of integers from 0 to 5).

The content component 108 may be configured to obtain weighting information and/or other information. The weighting information may include individual weights conveying importance of the individual attribute values in making a determination of the rejoin point in time. In some implementations, individual weights may be defined by one or more of qualitative values, quantitative values, and/or other information.

In some implementations, a qualitative value defining a weight may include qualitative expressions of importance. For example, a qualitative value defining a weight may include one or more of "not important", "less important", "moderate importance", "more important", "most important", and/or other considerations of qualitative expressions. In some implementations, a quantitative value defining a weight may include a numerical value, percentage, and/or value within a scale that may be representative of an amount or degree of importance. For example, a quantitative value may be a value on a numerical scale from 0 to 1, wherein 0 may correspond to no importance, 1 may correspond to most important, and decimals therebetween may correspond to varying degrees of importance. In some implementations, a qualitative value may correspond with a quantitative value. For example, a qualitative value of "not important" may correspond to a quantitative value of "0", a qualitative value of "most important" may correspond to a quantitative value of "1", and other variances in qualitative expressions may correspond to decimals between "0" and "1". The numerical scale from 0 to 1 is for illustrative purposes only, and in other implementations a different scale may be used (e.g., a scale of integers from 0 to 5).

In some implementations, one or more of the attribute information, weighting information, and/or other information may be determined through user input (see, e.g., user interface component 110), and/or other techniques. For example, one or more of the attribute information (attribute values), weighting information, and/or other information may be predefined or manually selected by a media source including one or more of a studio, a broadcast station, a remote host, a production facility, and/or other media sources.

In some implementations, one or more of the attribute information, weighting information, and/or other information may be determined through machine-learning and/or other techniques. The machine-learning techniques may include specially trained machine-learning models configured to output one or more of the attribute information, weighting information, and/or other information.

One or more machine-learning techniques may be trained, referred to as supervised learning. Training may be accomplished through user input, while the learning aspect of the machine-learning techniques may occur over time as the system 100 continues to run. For example, a user may provide a machine-learning model with training data. The training data may include the user-provided information (see, e.g., user interface component 110). Over time, based on continued use of the system 100 and input by users, the model may learn one or more of the attribute information, weighting information, and/or other information. It is contemplated that other types of machine learning, such as unsupervised learning, may also be utilized within the scope of this disclosure.

In order to determine the rejoin point in time, the system and methods described herein take into account impact of attribute values and weighting information. While in some implementations, individual attribute values and/or individual weighted attribute values may impact a determination of a rejoin point in time, it is contemplated that in other implementations, an aggregate of a set of attribute values and a set of weights may be utilized in such a determination. Utilizing the aggregate may include a balancing of the impact of each of the weighted attribute values to make the determination. For example, with attribute values and weights being expressed quantitatively, an aggregate of a set of weighted attributed values may be compared against a threshold value which may dictate one rejoin type over another. By way of non-limiting illustration, if the aggregate is a value below a first threshold value, then a join-in-progress type may be utilized (e.g., timeline 305 of FIG. 3 discussed below). If the aggregate is between (inclusively) the first threshold value and a second threshold value, then a playback type may be utilized (e.g., timeline 307 of FIG. 3 discussed below). If the aggregate is above the second threshold value, then a cue-point type may be utilized (e.g., timeline 309 of FIG. 3 discussed below). An aggregate may include, for example, an average of the weighted attribute values, a sum of the weighted attribute values, and/or other measures. In some implementations, an aggregate may include disregarding attribute value(s) of relatively lower weight so that attribute value(s) of the relatively highest weight may dictate the type of rejoin. The first threshold value and the second threshold value may be assigned automatically (e.g., via machine learning) or predefined or manually selected by a media source including one or more of a studio, a broadcast station, a remote host, a production facility, and/or other media sources.

The user interface component 110 may be configured to effectuate presentation of individual user interfaces on individual client computing platforms of one or more client computing platforms 126. Presentation may be effectuated by transmitting (e.g., serving) information to individual client computing platforms from server(s) 102. A user interface may include one or more user interface elements configured to facilitate user interaction with the user interface. The user interaction may include input to specify one or more of attribute information, weighting information, and/or other information. User interface elements may include one or more of a text input field, a drop-down menu, check boxes, a display window, a virtual button, a sliding scale, and/or other elements configured to facilitate user interaction.

Interruption component 112 may be configured to effectuate a recording of one or more of the live media broadcast, interstitial media content to be integrated into the live media broadcast, and/or other information. Upon start of the broadcast, one or more of live broadcast information, traffic schedule information, and/or other information may be received from the one or more media sources 120. Effectuating a recording may include storing information in electronic storage 116 and/or other storage location. The storing of the live broadcast information, interstitial media content, and/or other information may be effectuated in real time, and/or near real time, as the information is received from the one or more media sources 120. In some implementations, traffic schedule information may be obtained prior to the live media broadcast and stored to be made accessible for integration into the live media broadcast.

The interruption component 112 may be configured to obtain interruption information and/or other information. The interruption information may include one or more of information defining the interruption content, an indication of a start of the interruption, an indication of an end of the interruption, and/or other information. The interruption component 112 may be configured to monitor the content of the live media broadcast (i.e., the primary content or the interstitial media content) interrupted by the interruption. Monitoring the content of the live media broadcast may include one or more of determining an interruption start point in time during the live media broadcast corresponding to the start of the interruption, determining an interruption end point in time during the live media broadcast corresponding to the end of the interruption, determining a duration of the interruption, identifying content of the live media broadcast interrupted over the duration of the interruption, and/or other operations. In some implementations, interruption component 112 may determine the duration by timing the interruption from the start of the interruption, and/or based on a difference between the start and the end of the interruption.

In some implementations, identifying content of the live media broadcast interrupted by the interruption may include one or more of identifying primary content of the live media broadcast (and/or portion thereof) and/or interstitial media content (and/or portion(s) thereof) corresponding to the duration of the interruption. By way of non-limiting illustration, interruption component 112 may be configured to determine a portion, such as a segment or part of a segment, of the live media broadcast was interrupted. By way of non-limiting illustration, interruption component 112 may be configured to determine one or more interstitial media content that were interrupted in their entirety. By way of non-limiting illustration, interruption component 112 may be configured to determine a portion of an interstitial media content that was interrupted.

The rejoin component 114 may be configured to determine a rejoin point in time to rejoin the live media broadcast and/or interstitial media content after a completion of an interruption. In some implementations, the rejoin point in time may be determined based on one or more of the set of attribute values, the weighting information, content of the live media broadcast interrupted by the interruption, and/or other information. In some implementations, rejoin component 114 may be configured to, upon a completion of the interruption, determine the rejoin point in time.

In some implementations, determining the rejoin point in time may include determining a type of rejoin to carry out. The type of the rejoin may be determined based on one or more of the set of attribute values, the weighting information, content of the live media broadcast interrupted by the interruption, and/or other information. In some implementations, determining the type of rejoin based on one or more of the set of attribute values, the weighting information, content of the live media broadcast interrupted by the interruption, and/or other information may include aggregating the weighted attribute values. Individual attribute values may correspond to one or more types of rejoin. The weighting of the individual attribute values may change this correspondence. Further, a set of weighted attribute values may dictate the determination of the type of rejoin.

The types of rejoin may include one or more of a join-in-progress type, playback type, a cue-point type, and/or other types. In some implementations, one or more types of rejoin may correspond to a predetermined point in time selected to be the rejoin point in time. In some implementations, one or more types of rejoin may result in the rejoin point in time being determined on-the-fly.

Join-in-progress type may correspond to a predetermined point in time selected to be the rejoin point in time. The join-in-progress type may specify the rejoin point in time as the interruption end point in time during the live media broadcast corresponding to the end of the interruption. That is, the live media broadcast and/or integrated interstitial media may be rejoined as if it had been running in the background of the interruption. For this type, the recorded information (recording of one or more of the live media broadcast, interstitial media content, and/or other information) may not be used since the interrupted content may not be played back. Instead, the live feed may be continued at the interruption end point in time. Accordingly, the rejoin component 114 may be configured to, in response to determining a join-in-progress type, effectuate a distribution of live media broadcast at the interruption end point in time in the live media broadcast corresponding to the end of the interruption.

Playback type may correspond to a predetermined point in time which is to be the rejoin point in time. The playback type may specify the rejoin point in time as the interruption start point in time during the live media broadcast corresponding to the start of the interruption. That is, the live media broadcast and/or integrated interstitial media content may be rejoined as if it had been paused at the start of the interruption. For this type, the recorded information may be used to facilitate a replay. The rejoin component 114 may be configured to, in response to determining a playback type, determine the rejoin point in time is the interruption start point in time in the live media broadcast corresponding to the start of the interruption. The rejoin component 114 may be configured to effectuate a distribution of the recording at the rejoin point in time.

Cue-point type may correspond to the rejoin point in time being dynamically determined on-the-fly. The rejoin point in time may be determined based on one or more of the set of attribute values, the weighting information, content of the live media broadcast interrupted by the interruption, and/or other information. In some implementations, determining the rejoin point in time based on one or more of the set of attribute values, the weighting information, content of the live media broadcast interrupted by the interruption, and/or other information may include aggregating the weighted attribute values. Individual attribute values may correspond to one or more points in time in the live media broadcast that should be the rejoin point in time. The weighting of the individual attribute values may change this correspondence. Further, a set of weighted attribute values may dictate the determination of the rejoin point in time. The rejoin component 114 may be configured to, in response to determining a cue-point type, determine the rejoin point in time based on the set of attribute values, the weighting information, content of the live media broadcast interrupted by the interruption, and/or other information.

Figure 3:
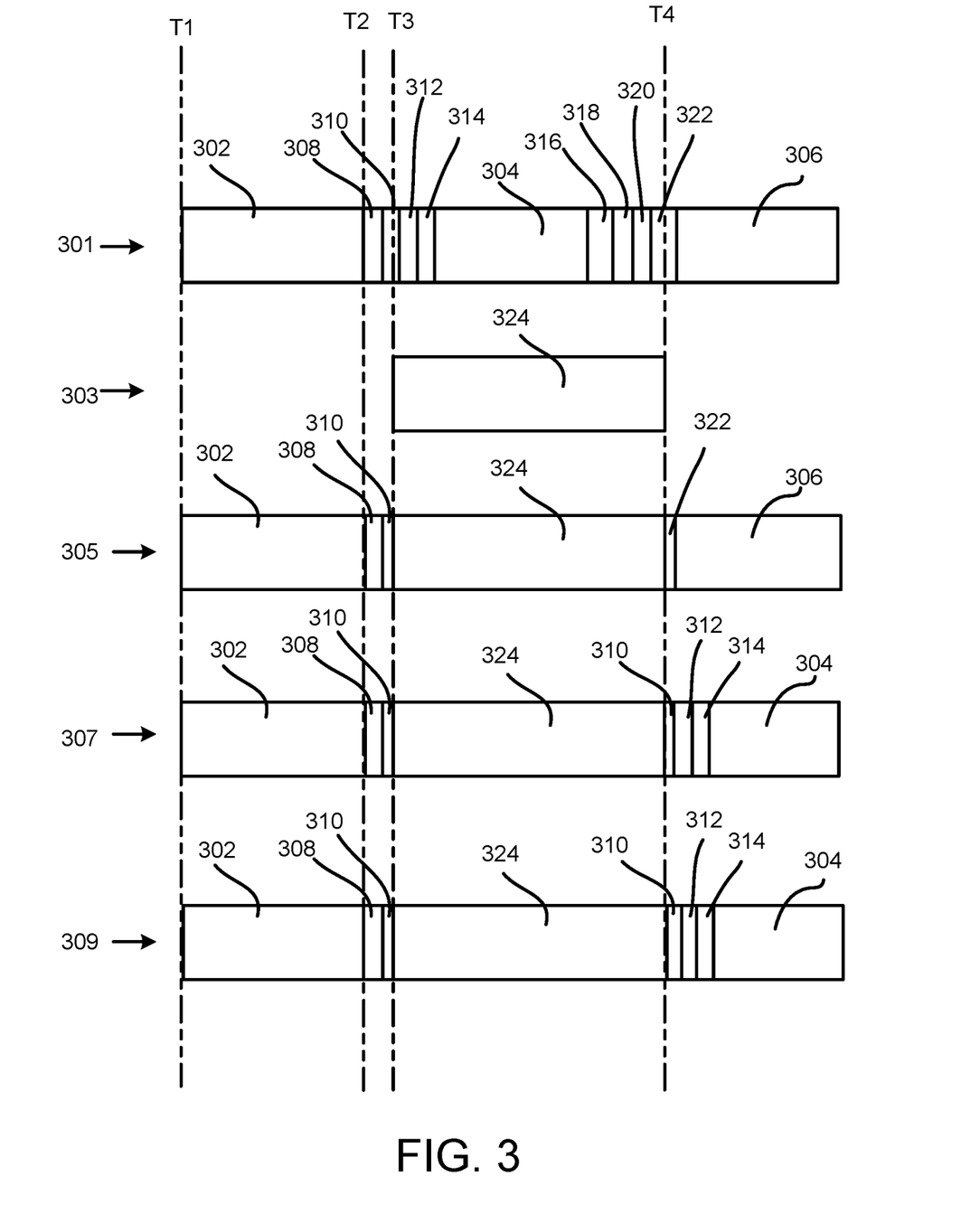
FIG. 3 illustrates a graphic of an implementation of the system of FIG. 1.

FIG. 3 illustrates a graphic of an implementation of the system of FIG. 1. In particular, FIG. 3 shows a graphic of different rejoin types and the distribution of the live media broadcast based on the corresponding rejoin point in time.

In FIG. 3, timeline 301 represents an intended timeline of the live media broadcast including integrated interstitial media content. By way of non-limiting illustration, the timeline may include a first segment 302 (i.e., a first segment of primary content) of the live media broadcast starting at time T1 and ending at time T2. The timeline 301 may include a first pod starting at time T2 and including first interstitial media content 308, second interstitial media content 310, third interstitial media content 312, and fourth interstitial media content 314. The timeline 301 may include a second segment 304 (i.e., a second segment of primary content) of the live media broadcast starting after the first pod. After the second segment 304, the timeline 301 may include a second pod including fifth interstitial media content 316, sixth interstitial media content 318, seventh interstitial media content 320, and eighth interstitial media content 322. The timeline 301 may include a third segment 306 (i.e., a third segment of primary content) of the live media broadcast starting after the second pod.

The timeline 303 represents an interruption 324 starting at time T3 and ending at time T4. Time T3 may be a time within a duration of the second interstitial media content 310. Time T4 may be a time within a duration of the eighth interstitial media content 322.

The timelines 305, 307, and 309 represent potential scenarios for subsequent viewing of the live media broadcast based on different types of rejoin.

Timeline 305 may represent a join-in-progress type rejoin. Accordingly, the live media broadcast may be rejoined in real time as if it had been playing in the background of the interruption. This may mean rejoining at time T4 within the duration of the eighth interstitial media content 322.

Timeline 307 may represent a playback type rejoin. Accordingly, the live media broadcast may be rejoined at an interruption start point in time in the live media broadcast corresponding to the start of the interruption. This may mean rejoining the live media broadcast at a point corresponding to time T3 when the interruption 324 started. The point in the live media broadcast corresponding to time T3 may be the time within the duration of the second interstitial media content 310 where the interruption 324 started (e.g., the last frame of the second interstitial media content 310 that was broadcast before the interruption or the frame immediately after the last frame of the second interstitial media content 310 that was broadcast before the interruption).

Timeline 309 may represent a cue-point type rejoin. The live media broadcast may be rejoined at a point in time determined on-the-fly which may be different from the join-in-progress and/or playback types. Here, the rejoin point in time may be determined to be a time corresponding to a start of the second interstitial media content 310 such that the second interstitial media content 310 is broadcast in its entirety without interruption. For example, it may be undesirable to rejoin in the middle of the second interstitial media content 310 (like the scenario in timeline 307).

Figure 2:
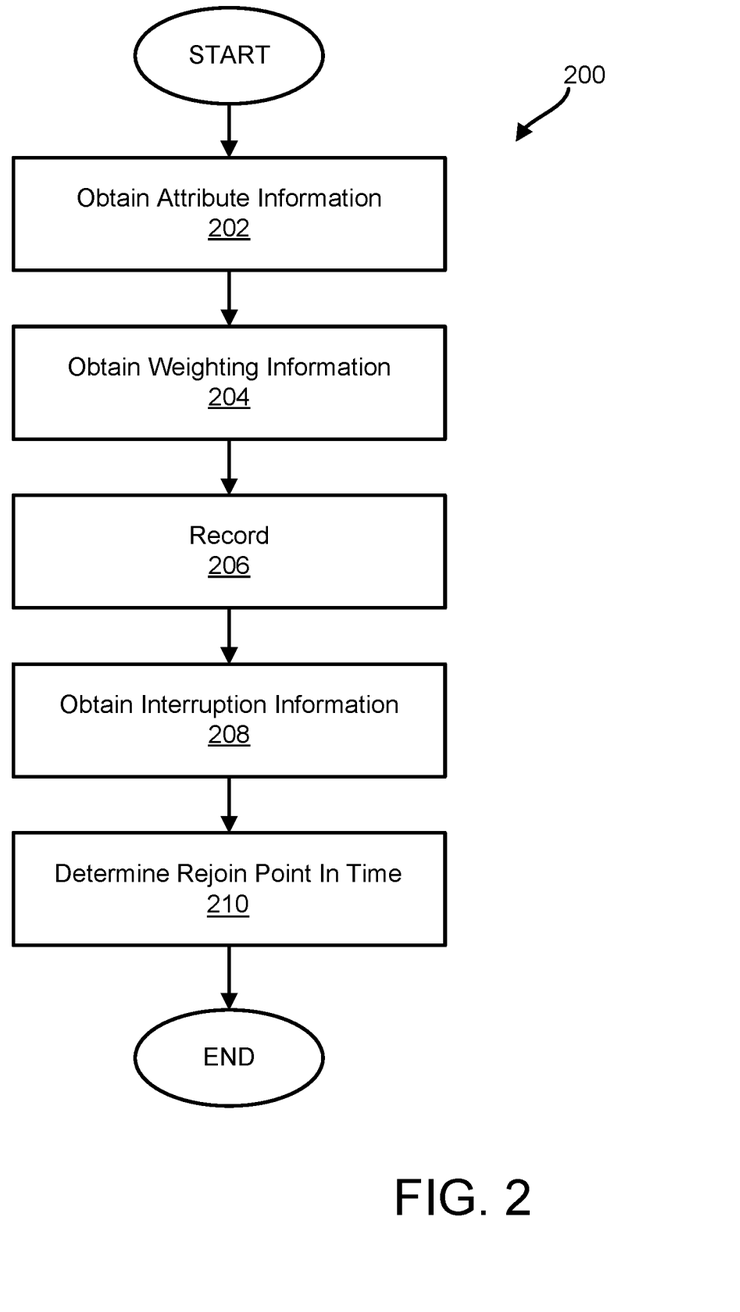
FIG. 2 illustrates a method to determine when to rejoin a live media broadcast after an interruption, in accordance with one or more implementations.

FIG. 2 illustrates a method 200 configured to determine when to rejoin a live media broadcast after an interruption, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations one or more operations of method 200 may be performed in parallel.

In some implementations, method 200 may be implemented in a system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more media sources, one or more interrupt content sources, and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

At an operation 202, attribute information and/or other information may be obtained. Attribute information may include a set of attribute values for a set of broadcast attributes of a live media broadcast. The live media broadcast may include primary content and one or more sets of interstitial media content to be presented during the live media broadcast. The set of attribute values for the set of broadcast attributes may impact a rejoin point in time in the live media broadcast for rejoining the live media broadcast upon a completion of an interruption. The set of broadcast attributes may include one or more of a primary content attribute, a primary distribution attribute, an interruption content attribute, an interruption distribution attribute, a pod number attribute, a pod position attribute, a subsequent media content attribute, a subsequent media distribution attribute, and/or other attributes. Individual attribute values of the primary distribution attribute, the interruption distribution attribute, and/or the subsequent media distribution attribute may specify distribution characteristics of the live media broadcast and the subsequent media content scheduled to be broadcast immediately after the live media broadcast. In some implementations, operation 202 may be performed by one or more physical processors executing a content component the same as or similar to content component 108 (shown in FIG. 1 and described herein).

At an operation 204, weighting information and/or other information may be obtained. The weighting information may include individual weights conveying importance of the individual attribute values in making a determination of the rejoin point in time. In some implementations, operation 204 may be performed by one or more physical processors executing a control component the same as or similar to control component 108 (shown in FIG. 1 and described herein).

At an operation 206, a recording of the live media broadcast may be effectuated. In some implementations, operation 206 may be performed by one or more physical processors executing an interruption component the same as or similar to interruption component 112 (shown in FIG. 1 and described herein).

At an operation 208, interruption information and/or other information may be obtained. The interruption information may include an indication of a start of the interruption. In some implementations, operation 208 may be performed by one or more physical processors executing an interruption component the same as or similar to interruption component 112 (shown in FIG. 1 and described herein).

At an operation 210, upon a completion of the interruption, the rejoin point in time may be determined based on one or more of the set of attribute values, the weighting information, content of the live media broadcast interrupted by the interruption (i.e., the portion or the primary content or the interstitial media content interrupted by the interruption), and/or other information. In some implementations, operation 210 may be performed by one or more physical processors executing a rejoin component the same as or similar to rejoin component 114 (shown in FIG. 1 and described herein). While in some implementations, individual attribute values and/or individual weighted attribute values may impact a determination of a rejoin point in time, it is contemplated that in other implementations, an aggregate of a set of attribute values and a set of weights may be utilized in such a determination. Utilizing the aggregate may include a balancing of the impact of each of the weighted attribute values to make the determination. For example, with attribute values and weights being expressed quantitatively, an aggregate of a set of weighted attributed values may be compared against a threshold value which may dictate one rejoin type over another. By way of non-limiting illustration, if the aggregate is a value below a first threshold value, then a join-in-progress type may be utilized (e.g., timeline 305 of FIG. 3). If the aggregate is between (inclusively) the first threshold value and a second threshold value, then a playback type may be utilized (e.g., timeline 307 of FIG. 3). If the aggregate is above the second threshold value, then a cue-point type may be utilized (e.g., timeline 309 of FIG. 3). An aggregate may include, for example, an average of the weighted attribute values, a sum of the weighted attribute values, and/or other measures. In some implementations, an aggregate may include disregarding attribute value(s) of relatively lower weight so that attribute value(s) of the relatively highest weight may dictate the type of rejoin. The first threshold value and the second threshold value may be assigned automatically (e.g., via machine learning) or predefined or manually selected by a media source including one or more of a studio, a broadcast station, a remote host, a production facility, and/or other media sources.

As described herein, certain attribute values may correspond to a determination of one rejoin type over another. Users of the system 100 (e.g., content providers) may assign weights that change the outcome of this determination based on their particular needs. Further, aggregating a set of weighted attribute values may further change this outcome. In particular, attribute values of relatively lower weight may be disregarded and/or attribute values of the relatively highest weight may dictate the type of rejoin. Non-limiting examples are given below for illustrative purposes. It is noted that quantitative measures are discussed in terms of being "relatively" high, low, large, and/or small. This is for illustrative purpose as it is envisioned that such measures may vary between different users of the system 100. Accordingly, the "relativity" may be dependent on the subjective considerations of the users of the system 100 (e.g., a media source including one or more of a studio, a broadcast station, a remote host, a production facility, and/or other media sources).

EXAMPLE 1

A relatively large quantity of means of distribution (i.e., a relatively low attribute value of the primary distribution attribute indicative of a lower importance to broadcast the primary content in its entirety) may correspond to a join-in-progress type determination because the large quantity of means of distribution may mean that consumers are likely to utilize other ones of the means of distribution of the live media broadcast to consume the live media broadcast. For example, if a first distribution channel (e.g., a particular network) of a live media broadcast is interrupted, and there is a second distribution channel available (e.g., a different network), then it is likely that consumers may simply switch from one distribution channel to another in the event of an interruption of one of them. Accordingly, if the primary distribution attribute is assigned a relatively high weight (e.g., a value greater than "0.5" to a value of "1"), this may result in a join-in-progress type rejoin being utilized. Alternatively, if the primary distribution attribute is assigned a relatively low weight (e.g., a value from "0" to "0.5"), this may result in another type of rejoin being utilized (e.g., playback type or cue-point type) if other broadcast attributes that are weighted more heavily are associated with higher attribute values.

EXAMPLE 2

A large variety of types of means of distribution (i.e., a relatively low attribute value of the primary distribution attribute indicative of a lower importance to broadcast the primary content in its entirety) may correspond to a join-in-progress type determination because the variety of types of means of distribution may mean that consumers may be concurrently consuming the live media broadcast from multiple sources. For example, a user may be viewing a television broadcast of a live event while simultaneously following a social media feed of the live event. Since consumers may be able to stay up to date on the live event via the social media feed, there may be no desire to replay content via the television broadcast after the end of an interruption of the television broadcast. Accordingly, if the primary distribution attribute is assigned a relatively high weight, this may result in a join-in-progress type rejoin being utilized. Alternatively, if the primary distribution attribute is assigned a relatively low weight, this may result in another type of rejoin being utilized (e.g., playback type or cue-point type) if other broadcast attributes that are weighted more heavily are associated with higher attribute values.

EXAMPLE 3

A relatively low worth of interstitial content (e.g., relatively low attribute values associated with the pod number attribute and/or pod position attribute) may correspond to a join-in-progress type determination because the low worth may mean the media broadcasters did not lose revenue from not being able to show interstitial content due to an interruption (where the presentation of interstitial content may otherwise result in consideration being paid). For example, interstitial content may include non-revenue-generating promotions of other content provided by the same media source. Since little (or no) commercial revenue was lost, there may be no desire to replay the interstitial content via the television broadcast after the end of an interruption of the television broadcast. Accordingly, if broadcast attributes related to the interstitial media content (e.g., pod number attribute and/or pod position attribute) are assigned a relatively high weight, this may result in a join-in-progress type rejoin being utilized. Alternatively, if broadcast attributes related to the interstitial media content are assigned a relatively low weight, this may result in another type of rejoin being utilized (e.g., playback type or cue-point type) if other broadcast attributes that are weighted more heavily are associated with higher attribute values.

EXAMPLE 4

A relatively high worth of a media program following the live media broadcast (i.e., a relatively high attribute value associated with the subsequent media content attribute) may correspond to a join-in-progress type determination because a relatively high worth may mean the media program following the live media broadcast should start on time and not be delayed due to replaying interrupted content. Accordingly, if a relatively high worth of a media program following the live media broadcast is assigned a relatively high weight, this may result in a join-in-progress type rejoin being utilized. Alternatively, if a relatively high worth of a media program following the live media broadcast is assigned a relatively low weight, this may result in another type of rejoin being utilized (e.g., playback type or cue-point type) if other broadcast attributes that are weighted more heavily are associated with higher attribute values.

EXAMPLE 5

A relatively small quantity of means of distribution (i.e., a relatively high attribute value associated with the primary distribution attribute indicative of a high importance to show the content in its entirety) may correspond to a playback type and/or a cue-point type determination because the small quantity of means may mean that consumers may not have other options to consume the live media broadcast. For example, if a single distribution channel (e.g., a particular network) is available, then consumers are likely to stay with the distribution channel through the interruption in order to consume a replay of interrupted content. Accordingly, if a relatively small quantity of means of distribution is assigned a relatively high weight, this may result in a playback type or cue-point type rejoin being utilized. Alternatively, if a relatively small quantity of means of distribution is assigned a relatively low weight, this may result in another type of rejoin being utilized (e.g., join-in-progress type) if other broadcast attributes that are weighted more heavily are associated with lower attribute values.

EXAMPLE 6

A large variety of types of means of distribution (e.g., a relatively low attribute value associated with a primary distribution attribute) may be assigned a low weight. The low weight may result in a playback type or cue-point type determination because the content providers assigning the low weight may not care that consumers may be concurrently consuming the live media broadcast from multiple sources. For example, a user may be viewing a television broadcast of a live event while simultaneously following a social media feed of the live event. Although consumers may be able to stay up to date on the live event via the social media feed, the content providers may desire that the consumers have access to a replay via the television broadcast after the end of an interruption of the television broadcast, and therefore, assign a lower weight to the primary distribution attribute.

EXAMPLE 7

A relatively high worth of interstitial content (e.g., a high attribute value associated with the pod number attribute and/or the pod position attribute) may correspond to a playback type and/or cue-point type determination because the high worth may mean the media broadcasters would lose revenue from not being able to show interstitial content due to an interruption. Since considerable commercial revenue may be lost, there may be a desire to replay interrupted interstitial content after the end of an interruption. Accordingly, if a relatively high worth of interstitial content is assigned a relatively high weight, this may result in a playback type or cue-point type rejoin being utilized.

EXAMPLE 8

A relatively low worth of a media program following the live media broadcast (i.e., a low attribute value associated with the subsequent media content attribute) may correspond to a playback type and/or cue-point type determination because a relatively low worth may mean it may not matter that the media program following the live media broadcast may be delayed due to replaying interrupted content. Accordingly, if a relatively low worth of a media program following the live media broadcast is assigned a relatively high weight, this may result in a playback type and/or cue-point type rejoin being utilized. Alternatively, if a relatively low worth of a media program following the live media broadcast is assigned a relatively low weight, this may result in another type of rejoin being utilized (e.g., join-in-progress type).

In some implementations, a playback type may be selected over a cue-point type, and vice versa, for a variety of reasons. Again, a playback type and a cue-point type include replaying the recorded live media broadcast at some point in time which is considered the rejoin point in time. The playback type may result in the rejoin point in time being the interruption start point in time, while the cue-point type may be a different point in time that may be determined on-the-fly. Non-limiting examples are given below for illustrative purposes.

The rejoin point in time under the cue-point type may be determined based on one or more of the set of attribute values, the weighting information, content of the live media broadcast interrupted by the interruption, the interruption start point in time corresponding to the start of the interruption, and/or other information. In some implementations, the rejoin point in time under the cue-point type may be specified as a start of a portion, segment, and/or scene of the live media broadcast. In some implementations, the rejoin point in time under the cue-point type may be specified as a start of interstitial media content. Non-limiting examples are provided below.

In some implementations, if the interruption start point in time is within a duration of interstitial media content, the rejoin point in time may be determined to be at the start of the interstitial media content (e.g., the interstitial media content is replayed). In some implementations, if the interruption start point in time is within a duration of a portion, segment, and/or scene of the live media broadcast, the rejoin point in time may be determined to be at the start of the portion, segment, and/or scene of the live media broadcast (e.g., the portion, segment, and/or scene of the live media broadcast is replayed). In some implementations, if the interruption start point in time is within a duration of interstitial media content, the rejoin point in time may be determined to be at a start of a subsequent interstitial media content and/or a start of a subsequent portion, segment, and/or scene of the live media broadcast. In some implementations, if the interruption start point in time is within a duration of a portion, segment, and/or scene of the live media broadcast, and a subsequent media programming is given a high weight, the rejoin point in time may be determined to be at a start of a subsequent portion, segment, and/or scene of the live media broadcast. The above descriptions are for illustration only and not to be considered limiting. Other values and/or other weights in aggregate may impact the rejoin point in time in other ways. For example, if the interruption start point in time is within a duration of a portion, segment, and/or scene of the live media broadcast, and a subsequent media programming is given a low weight, the rejoin point in time may be determined to be at a start of the portion, segment, and/or scene of the live media broadcast.

In some implementations rejoin component 114 may be configured to, in response to determining the rejoin point in time based on one or more of the set of attribute values, the weighting information, content of the live media broadcast interrupted by the interruption, and/or other information, effectuate a distribution of the recording at the rejoin point in time.

Figure 4:
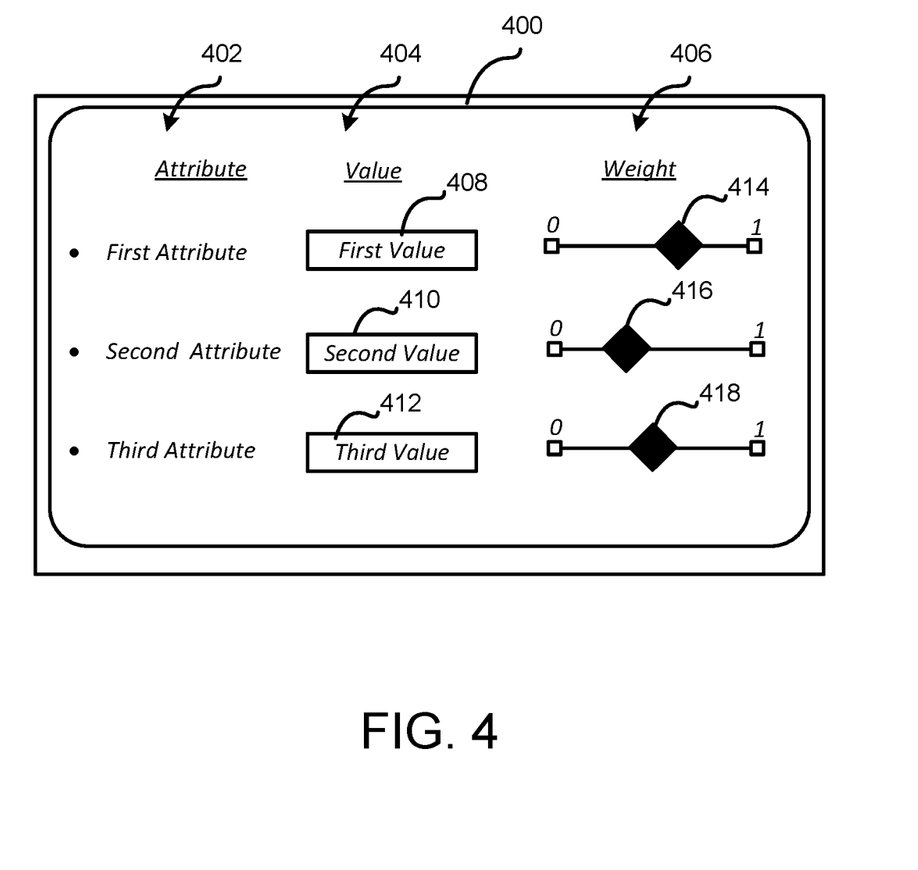
FIG. 4 illustrates a user interface, in accordance with one or more implementations.

FIG. 4 illustrates a user interface 400, in accordance with one or more implementations. The user interface 400 may include one or more user interface elements configured to facilitate user interaction with the user interface 400. The user interaction may include input to specify one or more of attribute information, weighting information, and/or other information. In some implementations, the user interface 400 may include a portion 402 displaying attributes (i.e., any of the broadcast attributes discussed above), a portion 404 displaying user interface elements configured to obtain user input to specify values of the attributes, a portion 406 displaying user interface elements configured to obtain user input to specify weights for the attribute values, and/or other components. By way of non-limiting illustration, a first user interface element 408 may include one or more of a text input box, drop down menu, and/or other element configured to obtain input to specify a first value of a first attribute. A second user interface element 410 may include one or more of a text input box, drop down menu, and/or other element configured to obtain input to specify a second value of a second attribute. A third user interface element 412 may include one or more of a text input box, drop down menu, and/or other element configured to obtain input to specify a third value of a third attribute. A fourth user interface element 414 may include a sliding scale configured to specify a first weight of the first value. A fifth user interface element 416 may include a sliding scale configured to specify a second weight of the second value. A sixth user interface element 418 may include a sliding scale configured to specify a third weight of the third value. Its noted that the depiction of the user interface 400 in FIG. 4 is for illustrative purposes only and is not to be considered limiting. Instead, it is to be understood that the user interface 400 may be configured in other ways and/or including other elements to facilitate user interaction in accordance with one or more implementations of the system 100 presented herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. It is to be understood that the present technology contemplates that one or more features of any claim can be dependent on and/or combined with one or more features of any other claim.

What is claimed is:

1. A system configured to determine when to rejoin a live media broadcast after an interruption, the system comprising:

one or more physical processors configured by machine-readable instructions to:
obtain a set of attribute values for a set of broadcast attributes of a live media broadcast, the live media broadcast including primary content and a set of interstitial media content to be presented during the primary content, the set of attribute values for the set of broadcast attributes impacting a rejoin point in time in the live media broadcast for rejoining the live media broadcast upon a completion of an interruption, the set of broadcast attributes including:
a first attribute related to the primary content, the first attribute being associated with a first attribute value of the set of attribute values, the first attribute value specifying a first importance of the primary content, and
a second attribute related to the set of interstitial media content, the second attribute being associated with a second attribute value of the set of attribute values, the second attribute value specifying a second importance of the set of interstitial media content;
obtain weighting information including individual weights conveying the first importance of the primary content and the second importance of the set of interstitial media content in making a determination of the rejoin point in time, the weighting information including a first weight assigned to the first attribute value and a second weight assigned to the second attribute value;
effectuate a recording of the live media broadcast;
obtain interruption information, the interruption information including an indication of a start of the interruption; and
upon a completion of the interruption, determine the rejoin point in time based on the set of broadcast attributes, the weighting information, and the interruption information, wherein determining the rejoin point in time comprises:
determining a type of rejoin to carry out upon the completion of the interruption, wherein types of rejoin comprise a join-in-progress type, a playback type, or a cue-point type.

2. The system of claim 1, wherein the weighting information is determined based on user input specifying the individual weights.

3. The system of claim 1, wherein the weighting information is determined automatically through machine-learning.

4. The system of claim 1, wherein the one or more physical processors are further configured by the machine-readable instructions to:
in response to determining the cue-point type, effectuate a distribution of the recording at the rejoin point in time;
in response to determining the join-in-progress type, effectuate a distribution of the live media broadcast at a point in time in the live media broadcast corresponding to the completion of the interruption; or in response to determining the playback type, determine the rejoin point in time is a point in time in the live media broadcast corresponding to the start of the interruption, and effectuate a distribution of the recording at the rejoin point in time.

5. The system of claim 1, wherein:

the set of broadcast attributes further includes a third attribute related to subsequent media content scheduled to be presented after the live media broadcast, the third attribute being associated with a third attribute value of the set of attribute values, the third attribute value specifying a third importance of the subsequent media content; and the weighting information further includes a third weight assigned to the third attribute value.

6. The system of claim 1, wherein the first attribute value comprises an aggregate of a first value related to a primary content attribute and a second value related to a primary distribution attribute.

7. The system of claim 6, wherein the second value related to the primary distribution attribute is determined, based in part, on a quantity of means of distribution of the live media broadcast.

8. The system of claim 1, wherein the second attribute value comprises an aggregate of a third value related to a pod number attribute and a fourth value related to a pod position attribute.

9. The system of claim 8, wherein:

the third value related to the pod number attribute is determined, based in part, on a monetary worth of the set of interstitial media content; and the fourth value related to the pod position attribute is determined, based in part, on a position of an individual interstitial media content of the set of interstitial media content within a pod.

10. A method to determine when to rejoin a live media broadcast after an interruption, the method comprising:

obtaining a set of attribute values for a set of broadcast attributes of a live media broadcast, the live media broadcast including primary content and a set of interstitial media content to be presented during the primary content, the set of attribute values for the set of broadcast attributes impacting a rejoin point in time in the live media broadcast for rejoining the live media broadcast upon a completion of an interruption, the set of broadcast attributes including:

a first attribute related to the primary content, the first attribute being associated with a first attribute value of the set of attribute values, the first attribute value specifying a first importance of the primary content, and a second attribute related to the set of interstitial media content, the second attribute being associated with a second attribute value of the set of attribute values, the second attribute value specifying a second importance of the set of interstitial media content;

obtaining weighting information including individual weights conveying the first importance of the primary content and the second importance of the set of interstitial media content in making a determination of the rejoin point in time, the weighting information including a first weight assigned to the first attribute value and a second weight assigned to the second attribute value;

effectuating a recording of the live media broadcast;

obtaining interruption information, the interruption information including an indication of a start of the interruption; and upon a completion of the interruption, determining the rejoin point in time based on the set of broadcast attributes, the weighting information, and the interruption information, wherein the determining the rejoin point in time comprises:

determining a type of rejoin to carry out upon the completion of the interruption, wherein types of rejoin comprise a join-in-progress type, a playback type, or a cue-point type.

11. The method of claim 10, wherein the weighting information is determined based on user input specifying the individual weights.

12. The method of claim 10, wherein the weighting information is determined automatically through machine-learning.

13. The method of claim 10, further comprising:

in response to determining the cue-point type, effectuate a distribution of the recording at the rejoin point in time;

in response to determining the join-in-progress type, effectuate a distribution of the live media broadcast at a point in time in the live media broadcast corresponding to the completion of the interruption; or in response to determining the playback type, determine the rejoin point in time is a point in time in the live media broadcast corresponding to the start of the interruption, and effectuate a distribution of the recording at the rejoin point in time.

14. The method of claim 10, wherein:

the set of broadcast attributes further includes a third attribute related to subsequent media content scheduled to be presented after the live media broadcast, the third attribute being associated with a third attribute value of the set of attribute values, the third attribute value specifying a third importance of the subsequent media content; and the weighting information further includes a third weight assigned to the third attribute value.

15. The method of claim 10, wherein the first attribute value comprises an aggregate of a first value related to a primary content attribute and a second value related to a primary distribution attribute.

16. The method of claim 15, wherein the second value related to the primary distribution attribute is determined, based in part, on a quantity of means of distribution of the live media broadcast.

17. The method of claim 10, wherein the second attribute value comprises an aggregate of a third value related to a pod number attribute and a fourth value related to a pod position attribute.

18. The method of claim 17, wherein:

the third value related to the pod number attribute is determined, based in part, on a monetary worth of the set of interstitial media content; and the fourth value related to the pod position attribute is determined, based in part, on a position of an individual interstitial media content of the set of interstitial media content within a pod.

* * * * *